US011139486B2

(12) United States Patent
Ichihara et al.

(10) Patent No.: US 11,139,486 B2
(45) Date of Patent: Oct. 5, 2021

(54) FUEL CELL STACK HAVING SEPARATORS WITH PROTRUSIONS

(71) Applicant: NISSAN MOTOR CO., LTD., Yokohama (JP)

(72) Inventors: Keiji Ichihara, Kanagawa (JP); Kazuhiro Takahata, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/308,099

(22) PCT Filed: Jun. 10, 2016

(86) PCT No.: PCT/JP2016/067362
§ 371 (c)(1),
(2) Date: Dec. 7, 2018

(87) PCT Pub. No.: WO2017/212638
PCT Pub. Date: Dec. 14, 2017

(65) Prior Publication Data
US 2019/0305324 A1    Oct. 3, 2019

(51) Int. Cl.
*H01M 8/02*      (2016.01)
*H01M 8/026*    (2016.01)
(Continued)

(52) U.S. Cl.
CPC ......... *H01M 8/026* (2013.01); *H01M 8/0247* (2013.01); *H01M 8/0258* (2013.01);
(Continued)

(58) Field of Classification Search
None
See application file for complete search history.

(56) References Cited

U.S. PATENT DOCUMENTS 7,785,748 B2 *   8/2010   Zhang ................... H01M 8/023
                                                                  429/480
2003/0157387 A1    8/2003   Hase et al.
(Continued)

FOREIGN PATENT DOCUMENTS

CN         103700801 A      4/2014
JP         2008-103210 A    5/2008
(Continued)

*Primary Examiner* — Ula C Ruddock
*Assistant Examiner* — Tony S Chuo
(74) *Attorney, Agent, or Firm* — Foley & Lardner LLP

(57) ABSTRACT

A fuel cell stack includes cell units and separators that are alternately stacked, in which each of the cell units includes a single cell. Each of the separators includes: at least one first ridge that is disposed on a first main surface of each of the separators at a predetermined interval to form at least one first gas channel; and at least one second ridge that is disposed on a second main surface of each of the separators at a predetermined interval to form at least one second gas channel. The at least one first ridge and the at least one second ridge are disposed at a regular interval around a center of each of the separators in a cross section perpendicular to the first or second gas channel. The at least one first ridge and the at least one second ridge of the separators are arranged such that a first ridge and a second ridge of a first separator of two of the separators holding each cell unit at least partly overlap respectively with a second ridge and a first ridge of a second separator of the two of the separators in a stacking direction of the separators across a single cell intervened between the two of the separators.

11 Claims, 10 Drawing Sheets

(51) Int. Cl.
  *H01M 8/12*      (2016.01)
  *H01M 8/242*     (2016.01)
  *H01M 8/2465*    (2016.01)
  *H01M 8/0247*    (2016.01)
  *H01M 8/24*      (2016.01)
  *H01M 8/0258*    (2016.01)
  *H01M 8/124*     (2016.01)

(52) U.S. Cl.
  CPC ............... *H01M 8/12* (2013.01); *H01M 8/24* (2013.01); *H01M 8/242* (2013.01); *H01M 8/2465* (2013.01); *H01M 2008/1293* (2013.01)

(56)          References Cited

U.S. PATENT DOCUMENTS

| | | | |
|---|---|---|---|
| 2007/0298308 A1 | 12/2007 | Yamamoto et al. | |
| 2008/0096085 A1 | 4/2008 | Tsunoda | |
| 2010/0055540 A1* | 3/2010 | Sugiura | H01M 8/241 |
| | | | 429/434 |
| 2011/0159395 A1 | 6/2011 | Sugiura et al. | |
| 2013/0236808 A1* | 9/2013 | Sugiura | H01M 8/0273 |
| | | | 429/480 |

FOREIGN PATENT DOCUMENTS

| | | |
|---|---|---|
| JP | 2010-118329 A | 5/2010 |
| JP | 2010-153158 A | 7/2010 |
| JP | 2011-165432 A | 8/2011 |
| JP | 2014-078337 A | 5/2014 |
| WO | WO-2002/078108 A1 | 10/2002 |
| WO | WO-2006/075786 A1 | 7/2006 |
| WO | WO-2009/157290 A1 | 12/2009 |

\* cited by examiner

FUEL CELL STACK HAVING SEPARATORS WITH PROTRUSIONS

TECHNICAL FIELD

The present invention relates to a fuel cell stack and a separator for a fuel cell stack. In more detail, the present invention relates to a solid oxide fuel cell stack and a separator for a solid oxide fuel cell stack.

BACKGROUND ART

Fuel cell stacks have been proposed that enables readily and inexpensively producing separators, holding an electrolyte-electrode assembly between identical separators, simplifying the overall structure of the stack and reducing the production cost (see Patent Document 1).

The fuel cell stack includes a stacked fuel cells, each of which includes an electrolyte-electrode assembly composed of an electrolyte intervened between an anode electrode and a cathode electrode, and a first separator and a second separator that hold the electrolyte-electrode assembly. The first separator and the second separator are constituted by respective separator structures that have the same but mutually inversed shapes, Each of the separator structures includes a holding portion that holds the electrolyte-electrode assembly and that forms a reaction gas channel for supplying a reaction gas along an electrode surface, and a reaction gas supplying portion that has reaction gas supplying communication holes formed in the stacking direction for supplying the reaction gas to the reaction gas channel.

CITATION LIST

Patent Document
  Patent Document 1: JP 2008-103210A

SUMMARY OF INVENTION

Technical Problem

However, a problem with the fuel cell stack in Patent Document 1 is that it cannot sometimes suitably transfer a load in the stacking direction. Further, another problem is that it cannot sometimes equalize pressure applied to its components.

The present invention has been made in view of the problems in the prior art. It is an object of the present invention to provide a fuel cell stack and a separator for a fuel cell stack that can suitably transfer a load in the stacking direction and that can equalize a pressure applied to its components.

Solution to Problem

The present inventors conducted a keen study for achieving the above-described object. As a result, they found that the above-described object can be achieved by arranging predetermined protrusions of two separators holding each cell unit such that they overlap with each other in the stacking direction. The present invention has thus been completed.

Advantageous Effects of Invention

With the present invention, it is possible to provide a fuel cell stack and a separator for a fuel cell stack that can suitably transfer a load in the stacking direction and that can equalize pressure applied to its components.

DESCRIPTION OF EMBODIMENTS

Figure 1:
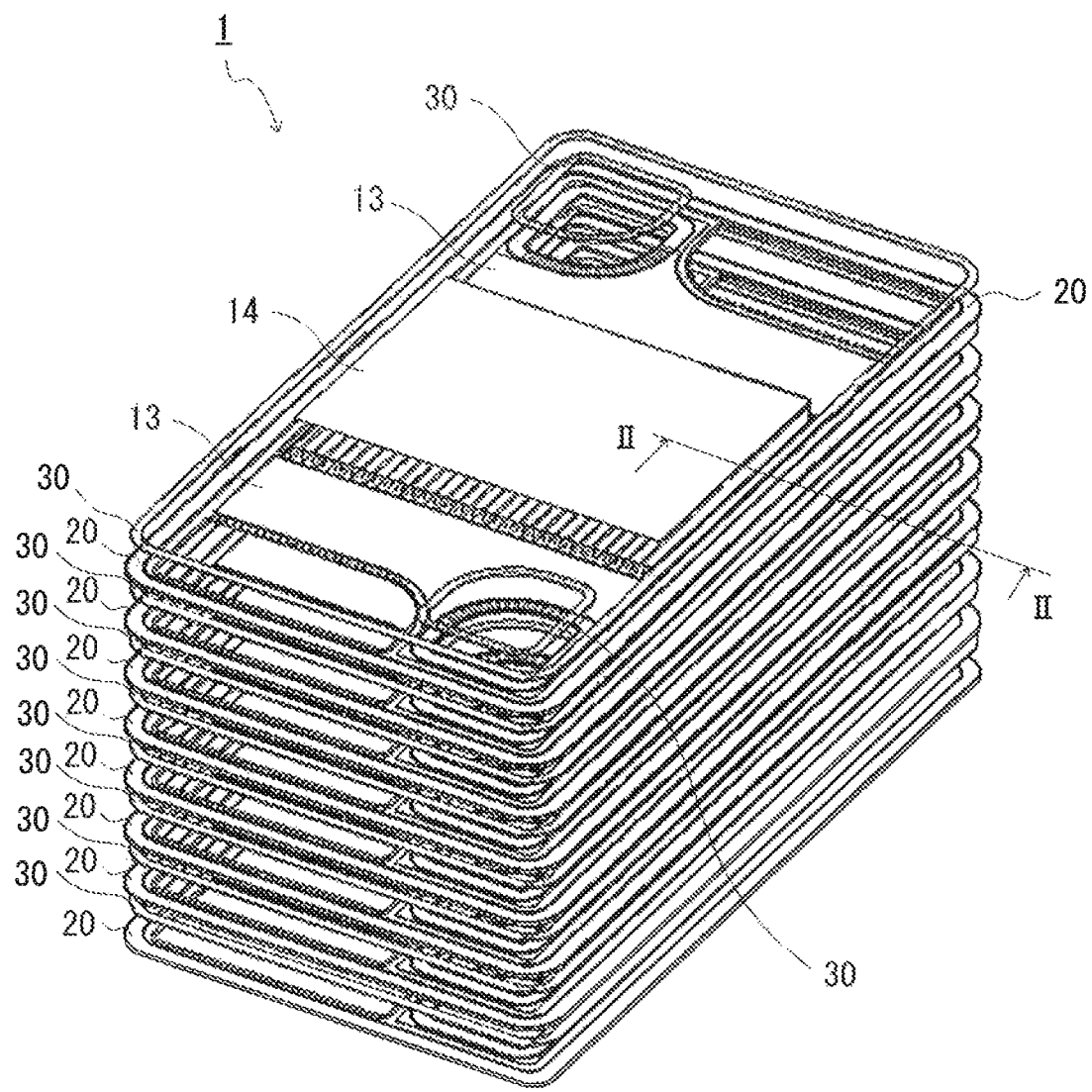
FIG. 1 is a schematic perspective view of a solid oxide fuel cell stack according to an embodiment of the present invention in a disassembled state.

Hereinafter, a solid oxide fuel cell stack and a separator for a solid oxide fuel cell stack according to an embodiment of the present invention will be described in detail referring to the drawings.

Figure 2:
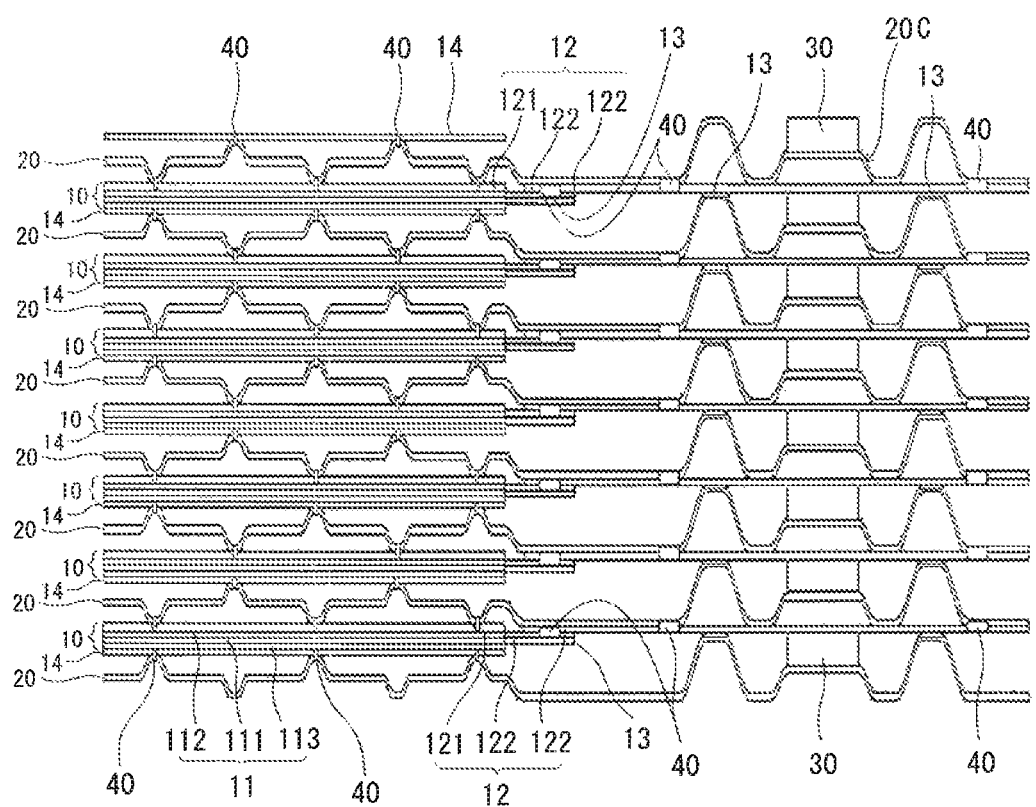
FIG. 2 is a schematic cross-sectional view of the solid oxide fuel cell stack in FIG. 1 in an assembled state taken along the line II-II.

First, the solid oxide fuel cell stack according to the embodiment of the present invention will be described in detail. FIG. 1 is a schematic perspective view of the solid oxide fuel cell stack according to the embodiment in a disassembled state. FIG. 2 is a schematic cross-sectional view of the solid oxide fuel cell stack in FIG. 1 in an assembled state taken along the line II-II.

As illustrated in FIG. 1 and FIG. 2, the solid oxide fuel cell stack 1 of the embodiment includes cell units 10 and separators 20 that are alternately stacked, in which each of the cell units 10 includes a respective single cell 11.

The side of each separator 20 (described in detail below) facing the cathode 113 is sealed with a sealing member 30 at an outer edge portion 20C. The sealing member 30 may be made of a material known in the art such as an insulating oxide.

Each cell unit 10 includes the single cell 11 and a metal support member 12 that supports the single cell 11. The cell unit 10 having this configuration is generally referred to as a metal-supported cell. The cell unit 10 further includes insulators 13 and a gas permeable current collector 14 according to need.

For example, the single cell 11 includes an electrolyte 111 containing an oxide ion conductor such as yttrium-stabilized zirconia, an anode 112 and a cathode 113, in which the electrolyte 111 is intervened between the anode 112 and the cathode 113.

The metal support member 12 includes a center portion 121 of porous metal and at least one peripheral portion 122 of metal disposed around the center portion 121, in which the center portion 121 is disposed on the opposite side of the anode 112 from the electrolyte 111. That is, the anode 112 is intervened between the electrolyte 111 and the center portion 121 of porous metal. At least a part of an outer edge portion 20C of each separator 20 is joined by joining portions 40 at the side of at least one peripheral portion 122 of the metal support member 12 facing the anode 112. For example, the joining portions 40 are formed by welding. That is, the side of the separator 20 facing the anode 112 is sealed with the joining portions 40 at least at a part of the outer edge portion 20C.

The insulators 13 are disposed on the side of at least one peripheral portion 122 facing the cathode 113. For example, the insulators 13 can be formed by a method known in the art such as applying an insulating material to the side of at least one peripheral portion 122 facing the cathode 113. The insulators 13 are also disposed on the side of at least one peripheral portion 122 facing the cathode 113 at the part proximate to the separator 20.

For example, the gas permeable current collector 14 may be constituted by an expanded metal or the like but is not particularly limited. The gas permeable current collector 14 is disposed on the opposite side of the cathode 113 from the electrolyte 111.

Figure 3:
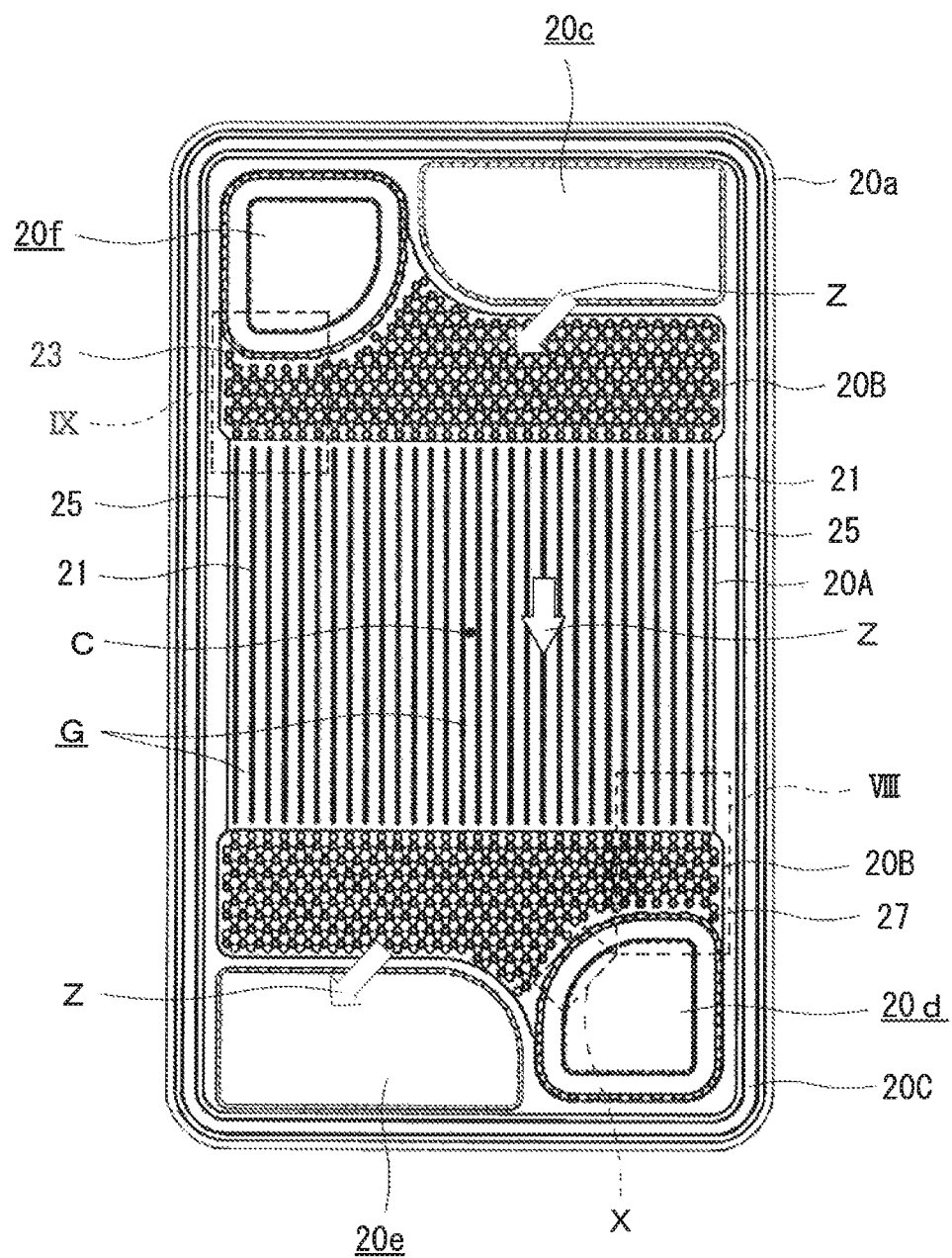
FIG. 3 is a schematic plan view of a first main surface of a separator in FIG. 1.
Figure 4:
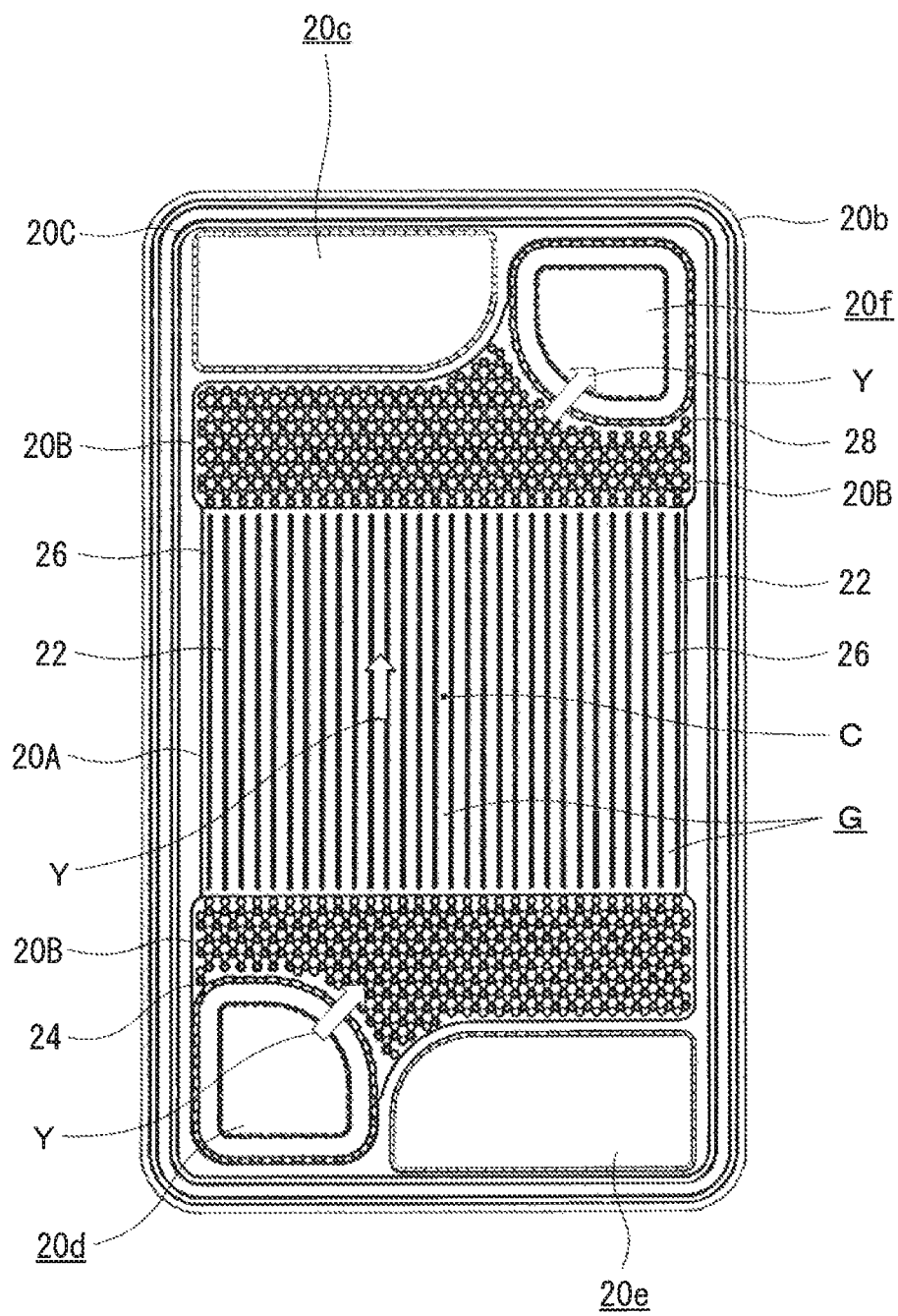
FIG. 4 is a schematic plan view of a second main surface of the separator in FIG. 1.

FIG. 3 is a schematic plan view of a first main surface of the separator in FIG. 1. The figure illustrates the upper side in FIG. 1 and FIG. 2 or the cathode side. FIG. 4 is a schematic plan view of a second main surface of a separator in FIG. 1. The figure illustrates the lower side in FIG. 1 and FIG. 2 or the anode side. The same reference signs are denoted to the same components as those described above, and the repetitive description thereof is omitted.

As illustrated in FIG. 3 and FIG. 4, each of the separators 20 includes at least one first ridge 21 that is disposed on the first main surface 20a at predetermined intervals to form at least one first gas channel G, and at least one second ridge 22 that is disposed on the second main surface 20b at predetermined intervals to form at least one second gas channel G.

Each separator 20 further includes at least one first protrusion 23 that is disposed on the first main surface 20a at predetermined intervals to form at least one first gas channel G, and at least one second protrusion 24 that is disposed on the second main surface 20b at predetermined intervals to form at least one second gas channel G.

At least one first protrusion 23 on the first main surface 20a and at least one second protrusion 24 on the second main surface 20b of each of the separators 20 are disposed such that the at least one first protrusion 23 is disposed point symmetrical to the at least one second protrusion 24 with respect to the center C of each of the separators 20 in in-plane rotation and protrudes in a direction opposite to a direction of protruding the second protrusion.

Each separator 20 has a point symmetrical shape in in-plane rotation with respect to the center C of each separator 20. That is, each separator 20 includes a power generation area 20A at a center part of the separator 20 and diffusion areas 20B at an outer side of the power generation area 20A. Each separator 20 has through holes 20c, 20d, 20e, 20f that are formed at an outer side of the power diffusion areas to penetrate the first main surface 20a and the second main surface 20b. It is needless to say that the through holes 20c, 20d, 20e, 20f are disposed point symmetrically with respect to the separator center C in in-plane rotation.

As used herein, the "separator center C" means, for example, the center of gravity of the outer shape of a separator in a view in the stacking direction.

In the first main surface 20a of each separator 20, the through hole 20c is used to supply cathode gas, and the through hole 20e is used to discharge the cathode gas. That is, the cathode gas is supplied through the through hole 20c, flows through one diffusion area 20B, the power generation area 20A and the other diffusion area 20B and is then discharged through the through hole 20e as illustrated by the arrows Z in FIG. 3. The through holes 20d, 20f are sealed with at least one sealing member (not shown) (see FIG. 1).

In the second main surface 20b of each separator 20, the through hole 20d is used to supply anode gas, and the through hole 20f is used to discharge the anode gas. That is, the anode gas is supplied through the through hole 20d, flows through one diffusion area 20B, the power generation area 20A and the other diffusion area 20B and is then discharged through the through hole 20f as illustrated by the arrows Y irk FIG. 4. The through holes 20c, 20e are sealed with at least one sealing member (not shown).

Figure 5:
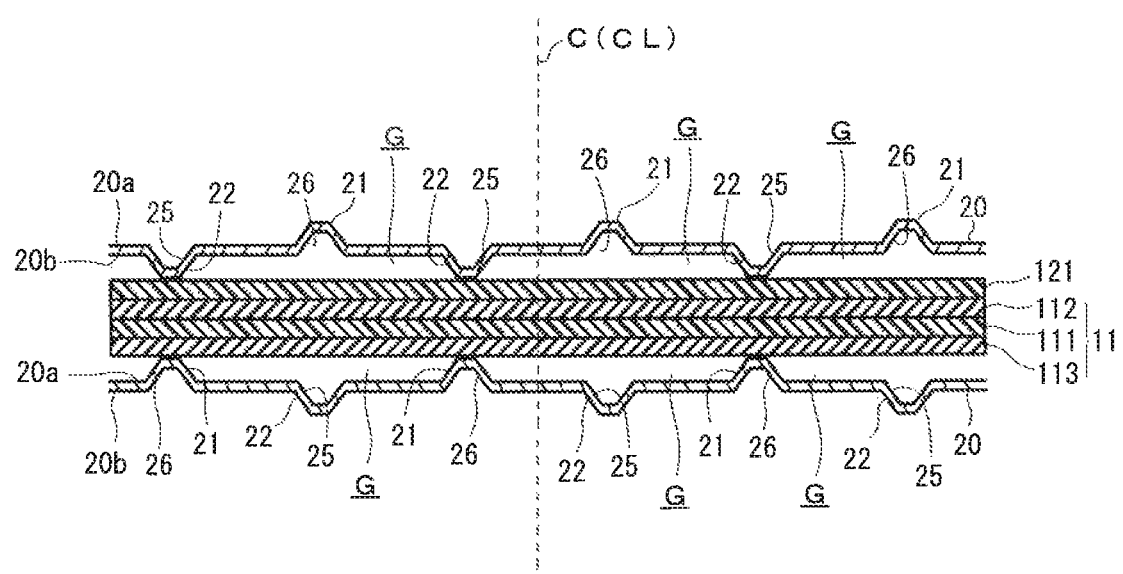
FIG. 5 is a schematic cross-sectional view illustrating an example arrangement of a first ridge and a second ridge of the separator in FIG. 3.

FIG. 5 is a schematic cross-sectional view illustrating an example arrangement of the first ridge and the second ridge of the separator in FIG. 3. The same reference signs are denoted to the same components as those described above, and the repetitive description thereof is omitted.

As described in FIG. 5, at least one first ridge 21 on the first main surface 20a and at least one second ridge 22 on the second main surface 20b of each separator 20 are arranged at regular intervals from the center C of each separator C in a cross section perpendicular to the first or second gas channel G.

The first ridges 21 and the second ridges 22 of the separators are arranged such that a first ridge 21 and a second ridge 22 of a first separator of two separators 20, 20 that hold each cell unit (the single cell 11 and the center portion 121 of the metal support member in FIG. 5) at least partly overlap respectively with a second ridge 22 and a first ridge 21 of a second separator of the two separators 20, 20 in the stacking direction of the separators 20, 20 across the single cell intervened between the two separators.

Further, in the two separators 20, 20 that hold each cell unit (the single cell 11 and the center portion 121 of the metal support member in FIG. 5), all the first ridges 21 and the second ridges 22 of the first separator 20 and the second separator 20 overlap s with the single cell 11 in the stacking direction of the separators 20, 20.

At least one first ridge 21 on the first main surface 20a and at least one second ridge 22 on the second main surface 20b of each separator 20 are disposed alternately from the center C of each separator in a cross section perpendicular to the first or second gas channel G.

Each separator 20 includes at least one first groove 26 that is disposed on the second main surface 20b of the separator 20 to form at least one second gas channel G, and at least one second groove 25 that is disposed on the first main surface 20a of the separator 20 to form at least one first gas channel G. At least one second groove 25 is defined by at least one second ridge 22 on the second main surface 20b of the separator 20. Further, at least one first groove 26 is defined by at least one first ridge 21 on the first main surface 20a of the separator 20.

A predetermined gas channel G and a predetermined intermediate portion CL are disposed such that they overlap with each other in the stacking direction of the separators 20, 20.

As used herein, the "predetermined gas channel U" refers to, for example, a gas channel that is through the center C of each separator among at least one first gas channel G formed by at least one first ridge 21 and at least one second groove 25 on the first main surface 20a of a separator 20 and at least one second gas channel G formed by at least one second ridge 22 and at least one first groove 26 on the second main surface 20b.

Further, the "predetermined intermediate portion CL" refers to, for example, an intermediate portion between the first ridge 21 on the first main surface 20a running closest to the center C of a separator and the second groove 25 on the first main surface 21a running closest to the center C of a separator or an intermediate portion between the second ridge 22 on the second main surface 20b running closest to the center C of a separator and the first groove 26 on the second main surface 20b running closest to the center C of a separator.

Each separator 20 is constituted by a single plate. Such separators can be formed form a metal plate such as a stainless-steel plate by press molding.

Figure 6:
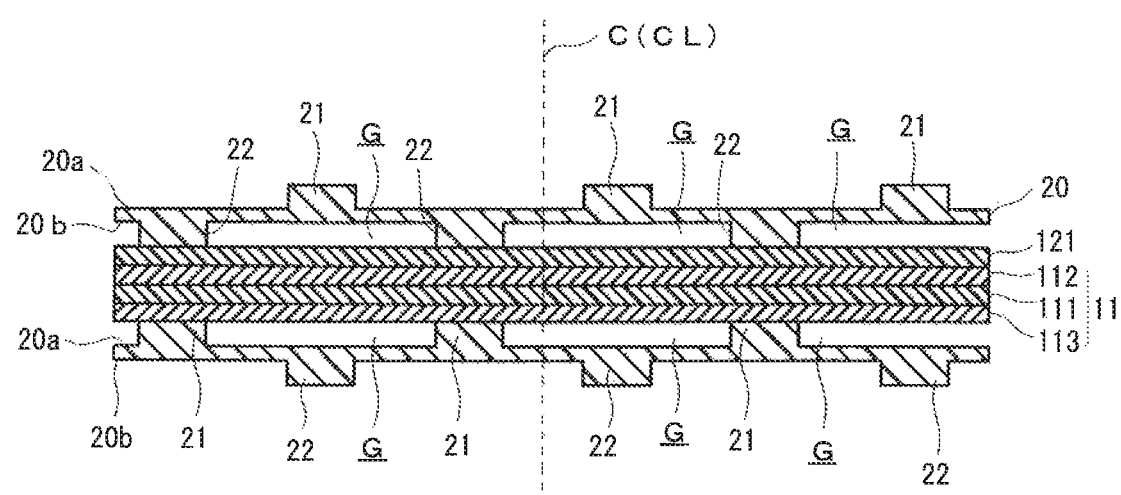
FIG. 6 is a schematic cross-sectional view illustrating another example arrangement of the first ridge and the second ridge of the separator.

FIG. 6 is a schematic cross-sectional view of another example arrangement of the first ridge and the second ridge of a separator, illustrating the same portion as in FIG. 5. The same reference signs are denoted to the same components as those described above, and the repetitive description is omitted.

As illustrated in FIG. 6, at least one first ridge 21 on the first main surface 20a and at least one second ridge 22 on the second main surface 20b of each separator 20 are arranged at regular intervals from the center C of the separator in a cross section perpendicular to the first or second gas channel G.

The first ridges 21 and the second ridges 22 of the separators are arranged such that a first ridge 21 and a second ridge 22 of a first separator of two separators 20, 20 that hold each cell unit (the single cell 11 and the center portion 121 of the metal support member in FIG. 6) overlap respectively with a second ridge and a first ridge of a second separator of the two separators 20, 20 in the stacking direction of the two separators 20, 20 across the single cell intervened between the two separators.

Further, in the two separators 20, 20 that hold each cell unit (the single cell 11 and the center portion 121 of the metal support member in FIG. 6), all the first ridges 21 of the second separator and the second ridges 22 of the first separator overlap with the single cell 11 in the stacking direction of the separators 20, 20.

At least one first ridge 21 on the first main surface 20a and at least one second ridge 22 on the second main surface 20b of each separator 20 are disposed alternately from the center C of the separator in a cross section perpendicular to the first or second gas channel U.

Each separator 20 is constituted by a single plate. For example, such separators can be formed from a metal plate such as a stainless plate by machining.

Figure 7:
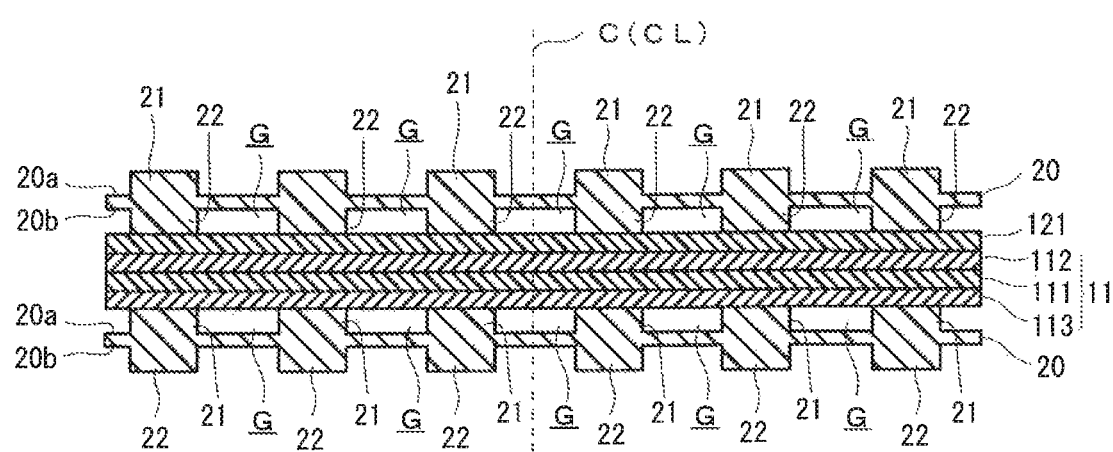
FIG. 7 is a schematic cross-sectional view illustrating yet another example arrangement of the first ridge and the second ridge of the separator.

FIG. 7 is a schematic cross-sectional view of yet another example arrangement of the first ridge and the second ridge of a separator, illustrating the same portion as in FIG. 5. The same reference signs are denoted to the same components as those described above, and the repetitive description thereof is omitted.

As illustrated in FIG. 7, at least one first ridge 21 on the first main surface 20a and at least one second ridge 22 on the second main surface 20b of each separator 20 are arranged at regular intervals from the center C of the separator in a cross section. perpendicular to the first or second gas channel G.

The first ridges 21 and the second ridges 22 of the separators 20 are arranged such that a first ridge 21 and a second ridge 22 of a first separator of two separators 20, 20 that hold each cell unit (the single cell 11 and the center portion 121 of the metal support member in FIG. 7) overlap respectively with a second ridge and a first ridge of a second separator of the two separators 20, 20 in the stacking direction of the separators 20 across the single cell intervened between the two separators 20, 20.

Further, in the two separators 20, 20 that hold each cell unit (the single cell 11 and the center portion 121 of the metal support member in FIG. 7), all the first ridges 21 of the second separator and all the second ridges 22 of the first separator overlap with the single cell 11 in the stacking direction of the separators 20.

Each separator 20 is constituted by a single plate. For example, such separators can be formed from a metal plate such as a stainless-steel plate by machining.

Figure 8:
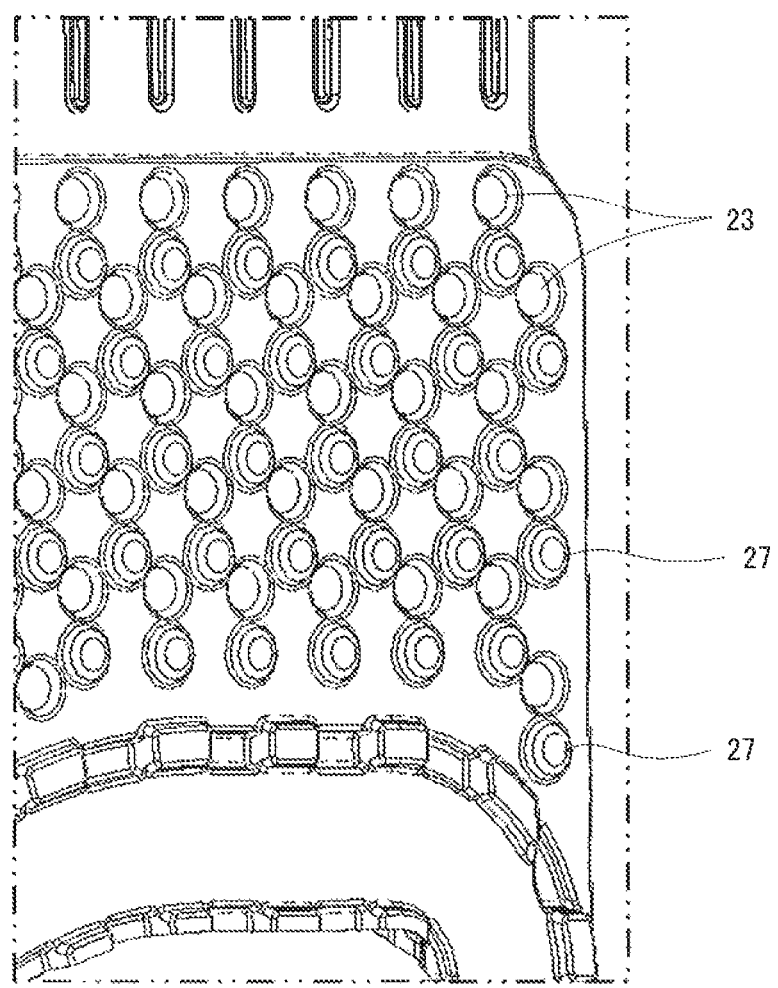
FIG. 8 is a schematic perspective view of the separator in FIG. 3, illustrating the part enclosed by the line VIII.
Figure 9:
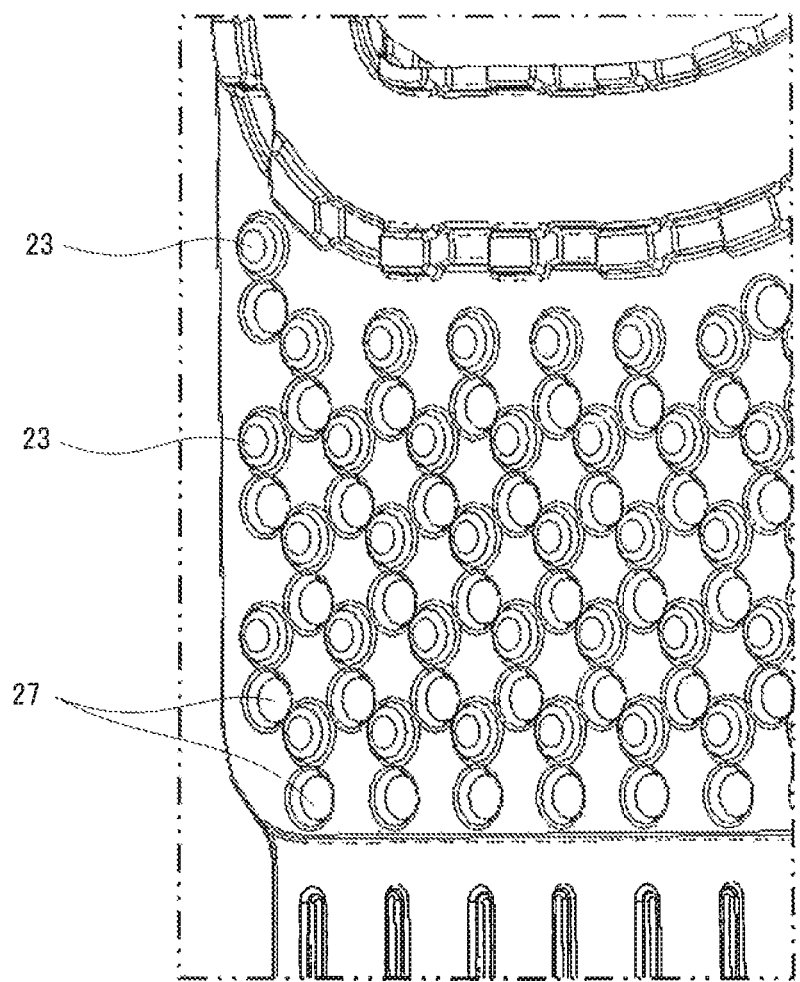
FIG. 9 is a schematic perspective view of the separator in FIG. 3, illustrating the part enclosed by the line IX.
Figure 10:
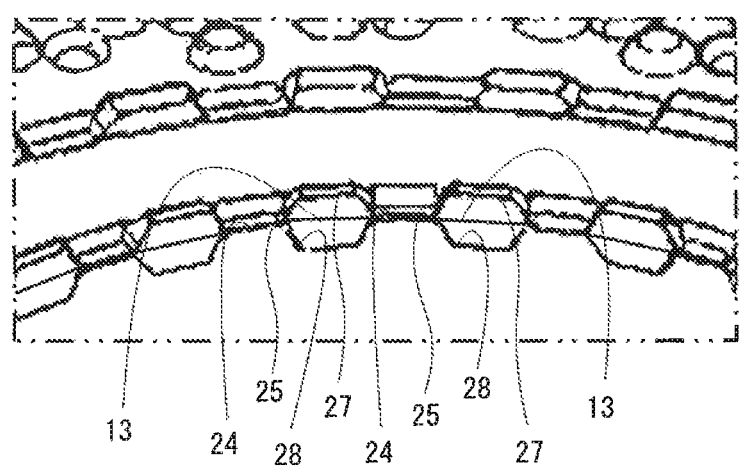
FIG. 10 is a schematic perspective view of the separator in FIG. 3, illustrating the part enclosed by the line X.

FIG. 8 is a schematic perspective view of the separator in FIG. 3, illustrating the part enclosed by the line VIII. FIG. 9 is a schematic perspective view of the separator in FIG. 3, illustrating the part enclosed by the line IX. FIG. 10 is a schematic perspective view of the separator in FIG. 3, illustrating the part enclosed by the line X.

As illustrated in FIG. 3, FIG. 4 and FIG. 8 to FIG. 10, in two separators 20, 20 that hold each cell unit 10, the first protrusion 23 and the second protrusion 24 of the first separator 20 overlap with each other in the stacking direction of the separators 20, 20.

In the two separators 20, 20 that hold each cell unit (the insulator 13 in FIG. 10), the first protrusions 23 and the second protrusions 24 overlap with at least one insulator 13 of the cell unit except for the single cell 11 in the stacking direction of the separators 20, 20.

Each separator 20 includes at least one first recess 28 that is disposed on the second main surface 20b of the separator 20 to form at least one second gas channel G, and at least one second recess 27 that is disposed on the first main surface 20a of the separator 20 to form at least one first gas channel G. At least one second recess 27 is defined by at least one second protrusion 24 that is disposed on the second main surface 20b of the separator 20. Further, at least one first recess 28 is defined by at least one first protrusion 23 that is disposed on the first main surface 20a of the separator 20.

As described above, with the following features (1) to (3), the fuel cell stack can suitably transfer a load in the stacking direction and equalize pressure applied to its components.

(1) Each separator includes at least one first ridge that is disposed on the first main surface of the separator at predetermined intervals to form at least one first gas channel, and at least one second ridge that is disposed on the second main surface of the separator at predetermined intervals to form at least one second gas channel.

(2) At least one first ridge on the first main surface and at least one second ridge on the second main surface are arranged at regular intervals from the center of a separator in a cross section perpendicular to the first or second gas channel.

(3) The first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators.

That is, the fuel cell stack includes the first ridge that is disposed on the first main surface of each separator at regular intervals from the center of the separator, and the second ridge that is disposed on the second main surface of each separator at regular intervals from the center of the separator. This can equalize pressure applied to the components of the fuel cell stack such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitably transferring a load in the stacking direction. Furthermore, the fuel cell stack is also advantageous in that the components such as cell units are less likely to be subjected to shear stress.

As described above, it is preferred that the fuel cell stack has the following feature (4). In the fuel cell stack, this allows suitable load transfer in the stacking direction and can equalize pressure applied to the cell units, particularly the single cells.

(4) The first ridge and the second ridge of the separator are arranged such that first ridges and second ridges of two separators that hold each cell unit at least partly overlap with the single cell in the stacking direction of the separators.

That is, the fuel cell stack includes the first ridge that is disposed on the first main surface of each separator at regular intervals from the center of the separator, and the second ridge that is disposed on the second main surface of each separator at regular intervals from the center of the separator. In the fuel cell stack, this can equalize pressure applied to the components such as cell units. Further in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Further, in the fuel cell stack, the first and second ridges of two separators that hold each cell unit at least partly overlap with the single cell in the stacking direction of the separators. In the fuel cell stack, this can particularly equalize pressure applied to the single cells. Further, the fuel cell stack is also advantageous in that the components such as cell units are less likely to be subjected to shear stress.

As described above, it is preferred that the fuel cell stack further has the following feature (5). In the fuel cell stack, this not only allows suitable load transfer in the stacking direction and can equalize pressure applied to the components, but also can secure the suitable gas channels.

(5) At least one first ridge on the first main surface and at least one second ridge on the second main surface are disposed alternately from the center of each separator in a cross section perpendicular to the first or second gas channel.

That is, the fuel cell stack includes the first ridge that is disposed on the first main surface of the separator at regular intervals from the center of the separator, and the second ridge that is disposed on the second main surface of the separator at regular intervals from the center of the separator. In the fuel cell stack, this can equalize the pressure applied to the components such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Furthermore, in the fuel cell stack, the first ridge on the first main surface and the second ridge on the second main surface are disposed alternately from the center of each separator in a cross section perpendicular to the first or second gas channel. In the fuel cell stack, this can secure the suitable gas channels. Further, the fuel cell stack is also advantageous in that the components such as cell units are less likely to be subjected to shear stress.

As described above, it is preferred that the fuel cell stack has the following feature (6). In the fuel cell stack, this not only allows more suitable load transfer in the stacking direction and can equalize pressure applied to the components, but also can secure the more suitable gas channels.

(6) Each separator includes at least one first groove that is disposed on the second main surface to form at least one second gas channel, and at least one second groove that is disposed on the first main surface to form at least one first gas channel. At least one first groove on the second main surface is defined by at least one first ridge on the first main surface of the separator. Further, at least one second groove on the first main surface is defined by at least one second ridge on the second main surface.

That is, the fuel cell stack includes the first ridge that is disposed on the first main surface of the separator at regular intervals from the center of the separator, and the second ridge that is disposed on the second main surface of the separator at regular intervals from the center of the separator. In the fuel cell stack, this can equalize pressure applied to the components such as cell units. Further, in the fuel cell stack, the first ridge and the second ridge of the separators are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Further, the fuel cell stack includes the predetermined first groove that is disposed on the second main surface to form the second gas channel, and the predetermined second groove that is disposed on the first main surface to form the first gas channel. This can impart a spring function to the separators, which are generally compressed in an assembled state. In the fuel cell stack, this can secure more suitable gas channels and further equalize pressure applied to the components such as cell units. Further, the fuel cell stack is also advantageous in that the components such as cell units are less likely to be subjected to shear stress.

Furthermore, as described above, it is preferred that the fuel cell stack has the following feature (7). In the fuel cell stack, this not only allows more suitable load transfer in the stacking direction and can equalize pressure applied to the components, but also can secure the more suitable gas channels.

(7) A predetermined gas channel overlaps with a predetermined intermediate portion in the stacking direction of the separators. As used herein, the "predetermined gas channel" refers to a gas channel that is through the center of each separator among at least one first gas channel formed by at least one first ridge and at least one second groove on the first main surface and at least one second gas channel formed by at least one second ridge and at least one first groove on the second main surface. Further, the "predetermined intermediate portion" refers to an intermediate portion between the first or second ridge on the first or second main surface that runs closest to the center of each separator and the second or first groove on the first or second main surface that runs closest to the center of the separator.

That is, the fuel cell stack includes the first ridge that is disposed on the first main surface of the separator at regular intervals from the center of the separator, and the second ridge that is disposed on the second main surface at regular intervals from the center of the separator. In the fuel cell stack, this can equalize pressure applied to the components such as cell units. Further, in the fuel cell stack, the first ridge and the second ridge of the separators are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Further, the fuel cell stack includes the predetermined first groove that is disposed on the second main surface to form the second gas channel, and the predetermined second groove that is disposed on the first main surface to form the first gas channel. This can impart a spring function to the separators, which are generally compressed in an assembled state. In the fuel cell stack, this can secure the more suitable gas channels and further equalize pressure applied to the components such as cell units. Further, in the fuel cell stack, the predetermined gas channel overlaps with the predetermined intermediate portion in the stacking direction of the separators. Accordingly, it is possible to provide an equal number of the first ridge and the second ridge that hold each single cell. In the fuel cell stack, this can further equalize pressure applied to the single cells and allows more suitable load transfer in the stacking direction. Furthermore, the fuel cell stack is also advantageous in that the components such as cell units are less likely to be subjected to shear stress.

As described above, it is preferred that the fuel cell stack has the following features (8) to (10). In the fuel cell stack, this allows transferring a load in the stacking direction more suitably and can further equalize pressure applied to the components of the cell units.

(8) Each separator includes at least one first protrusion that is disposed on the first main surface of the separator at predetermined intervals to form at least one first gas channel, and at least one second protrusion that is disposed on the second main surface at predetermined intervals to form at least one second gas channel.

(9) At least one first protrusion on the first main surface is disposed point symmetrical to at least one second protrusion on the second main surface with respect to the center of each of the separators in in-plane rotation and protrudes in a direction opposite to a direction of protruding the second protrusion.

(10) The first protrusion and the second protrusion of each separator are arranged such that first protrusions and the second protrusions of two separators that hold each cell unit overlap with each other in the stacking direction of the separators.

That is, the fuel cell stack includes the first ridge that is disposed on the first main surface of the separator at regular intervals from the center of the separator, and the second ridge that is disposed on the second main surface of the separator at regular intervals from the center of the separator. In the fuel cell stack, this can equalize pressure applied to the components such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Further, the fuel cell stack includes the first protrusion that is disposed on the first main surface of each separator at predetermined intervals to form the first gas channel, and the second protrusion that is disposed on the second main surface of each separator at predetermined interval to form the second gas channel. In the fuel cell stack, this can further equalize pressure applied to the components such as cell units. Further, in the fuel cell stack, the first protrusion on the first main surface is disposed point symmetrical to the second protrusion on the second main surface with respect to the center of each of the separator in in-plane rotation and protrudes in the direction opposite to the direction of protruding the second protrusion. This can further improve the flatness of the fuel cell stack. That is, the separator is installed via the cell unit by rotating the separator by 180 degrees in a plane with respect to the center of the separator, which can further improve the flatness of the fuel cell stack. In the fuel cell stack, this can further equalize pressure applied to the components.

Further, in the fuel cell stack, this allows more suitable load transfer in the stacking direction. Furthermore, in the fuel cell stack, the first and second protrusions of two separators that hold each cell unit overlap with each other in the stacking direction of the separators. In the fuel cell stack, this allows more suitable load transfer in the stacking direction. Further, the fuel cell stack is also advantageous in that the components such as cell units are less likely to be subjected to shear stress As described above, it is preferred that the fuel cell stack further has the following feature (11). In the fuel cell stack, this allows more suitable load transfer in the stacking direction and can equalize pressure applied to the components of the cell units.

(11) The first protrusion and the second protrusion of each separator are arranged such that first protrusions and second protrusions of two separators that hold each cell unit at least partly overlap with the cell unit except for a single cell in the stacking direction of the separators.

That is, the fuel cell stack includes the first ridge that is disposed on the first main surface of the separator at regular intervals from the center of the separator, and the second ridge that is disposed on the second main surface of the separator at regular intervals from the center of the separator. In the fuel cell stack, this can equalize pressure applied to the components such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Further, the fuel cell stack includes the first protrusion that is disposed on the first main surface of each separator at predetermined intervals to form the first gas channel, and the second protrusion that is disposed on the second main to surface of each separator at predetermined interval to form the second gas channel. In the fuel cell stack, this can further equalize pressure applied to the components such as cell units. In the fuel cell stack, the first protrusion on the first main surface is disposed point symmetrical to the second protrusion on the second main surface with respect to the center of each of the separators in in-plane rotation and protrudes in the is direction opposite to the direction of protruding the second protrusion. In the fuel cell stack, this can further improve the flatness of the fuel cell stack. That is, the separator is installed via the cell unit by rotating the separator by 180 degrees in a plane with respect to the center of the separator, which can further improve the flatness of the fuel cell stack. In the fuel cell stack, this can further equalize pressure applied to the components. Further, in the fuel cell stack, this allows more suitable load transfer in the stacking direction. Furthermore, in the fuel cell stack, the first and second protrusions of two separators that hold each cell unit overlap with each other in the stacking direction of the separators. In the fuel cell stack, this allows more suitable load transfer in the stacking direction. Further, in the fuel cell stack, the first and second protrusions of two separators that hold each cell unit overlap with the cell unit except for the single cell in the stacking direction of the separators. In the fuel cell stack, this can particularly further equalize pressure applied to the cell units except for the single cells. Further, the fuel cell stack is also advantageous in that the components such as cell units are less likely to be subjected to shear stress.

As described above, it is preferred that the fuel cell stack has the following feature (12). In the fuel cell stack, this allows more suitable load transfer in the stacking direction and can further equalize pressure applied to the components of the cell units.

(12) Each separator includes at least one first recess that is disposed on the second main surface to form at least one second gas channel, and at least one second recess that is disposed on the first main surface to form at least one first gas channel, At least one first recess on the second main surface is defined by at least one first protrusion on the first main surface of the separator. Further, at least one second recess on the first main surface is defined by at least one second protrusion on the second main surface.

That is, the fuel cell stack includes the first ridge that is disposed on the first main surface of the separator at regular intervals from the center of the separator, and the second ridge that is disposed on the second main surface of the separator at regular intervals from the center of the separator. In the fuel cell stack, this can equalize pressure applied to the components such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Further, the fuel cell stack includes the first protrusion that is disposed on the first main surface of each separator at predetermined intervals to form the first gas channel, and the second protrusion that is disposed on the second main surface of each separator at predetermined interval to form the second gas channel. In the fuel cell stack, this can further equalize pressure applied to the components such as cell units. In the fuel cell stack, the first protrusion on the first main surface is disposed point symmetrical to the second protrusion on the second main surface with respect to the center of the separator in in-plane rotation and protrudes in the direction opposite to the direction of protruding the second protrusion. In the fuel cell stack, this can further improve the flatness of the fuel cell stack. That is, the separator is installed via the cell unit by rotating the separator by 180 degrees in a plane with respect to the center of the separator, which can further improve the flatness of the fuel cell stack. In the fuel cell stack, this can further equalize pressure applied to the components. Further, in the fuel cell stack, this allows more suitable load transfer in the stacking direction. Furthermore, in the fuel cell stack, the first and second protrusions of two separators that hold each cell unit overlap with each other in the stacking direction of the separators. In the fuel cell stack, this allows more suitable load transfer in the stacking direction. Further, the fuel cell stack includes the predetermined first recess that is disposed on the second main surface to form the second gas channel, and the predetermined second recess that is disposed on the first main surface to form the first gas channel. This can impart a spring function to the separators, which are generally compressed in an assembled state. In the fuel cell stack, this can secure the more suitable gas channels and further equalize pressure applied to the components such as cell units. Further, the fuel cell stack is also advantageous in that the components such as cell units are less likely to be subjected to shear stress.

As described above, it is preferred that the fuel cell stack has the following feature (1). In the fuel cell stack, this allows more suitable load transfer in the stacking direction and can further equalize pressure applied to the components of the cell units.

(13) Each separator has a point symmetrical shape with respect to the center of each separator in in-plane rotation.

That is, the fuel cell stack includes the first ridge that is disposed on the first main surface of the separator at regular intervals from the center of the separator, and the second ridge that is disposed on the second main surface at regular intervals from the center of the separator. In the fuel cell stack, this can equalize pressure applied to the components such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Furthermore, the separator is installed via the cell unit by rotating the separator by 180 degrees in a plane with respect to the center of the separator, which can further improve the flatness of the fuel cell stack. In the fuel cell stack, this can further equalize pressure applied to the components. Further, in the fuel cell stack, this allows more suitable load transfer in the stacking direction. Furthermore, the fuel cell stack is also advantageous in that the components such as cell units are less likely to be subjected to shear stress. Further, the fuel cell stack is also advantageous in simplification of the overall fuel cell stack and reduction of the production cost.

As described above, it is preferred that the fuel cell stack has the following feature (14). In the fuel cell stack, this allows more suitable load transfer in the stacking direction and can further equalize pressure applied to the components of the cell units.

(14) Each separator is constituted by a single plate.

That is, the fuel cell stack includes the first ridge that is disposed on the first main surface of the separator at regular intervals from the center of the separator, and the second ridge that is disposed on the second main surface of the separator at regular intervals from the center of the separator. In the fuel cell stack, this can equalize pressure applied to the components such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. Furthermore, the separator is installed via the cell unit by rotating the separator by 180 degrees in a plane with respect to the center of the separator, which can further improve the flatness of the fuel cell stack. In the fuel cell stack, this can further equalize pressure applied to the components. Further, in the fuel cell stack, this allows more suitable load transfer in the stacking direction. Furthermore, the fuel cell stack is also advantageous in that the components such as cell units are less likely to be subjected to shear stress. Further, the fuel cell stack is also advantageous in simplification of the overall fuel cell stack and reduction of the production cost.

As described above, it is preferred that the fuel cell stack has the following features (15) to (17). The fuel cell stack having these features can also suitably transfer a load in the stacking direction and equalize pressure applied to the components of the cell units.

(15) Each cell unit includes a single cell in which an electrolyte is intervened between an anode and a cathode, a metal support member including a center portion of porous metal and at least one peripheral portion of metal around the center portion, and at least one insulator.

(16) The anode is intervened between the electrolyte and the center portion.

(17) At least one insulator is disposed at the cathode side of at least one peripheral portion.

That is, the fuel cell stack includes the first ridge that is disposed on the first main surface of the separator at regular intervals from the center of the separator, and the second ridge that is disposed on the second main surface of the separator at regular intervals from the center of the separator. In the fuel cell stack, this can equalize pressure applied to the components such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. In the fuel cell stack, the number of parts to be assembled can be reduced since each single cell is produced as a unit. This can reduce the production cost of the overall fuel cell stack.

As described above, it is preferred that the fuel cell stack has the following feature (18). In the fuel cell stack, this allows more suitable load transfer in the stacking direction and can further equalize pressure applied to the components of the cell units.

(18) At least a part of an outer edge portion of each separator is joined to the anode side of at least one peripheral portion.

That is, the fuel cell stack includes the first ridge that is disposed on the first main surface of the separator at regular intervals from the center of the separator, and the second ridge that is disposed on the second main surface of the separator at regular intervals from the center of the separator. In the fuel cell stack, this can equalize pressure applied to the components such as cell units. Further, in the fuel cell stack, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction. In the fuel cell stack, the number or parts to be assembled can be reduced since each single cell is produced as a unit. This can reduce the production cost of the overall fuel cell stack. Further, in the fuel cell stack, at least a part of the outer edge portion of the separator is joined to the anode side of at least one peripheral portion. In the fuel cell stack, this can prevent the occurrence of misalignment of the separators in the plane without providing any additional component. In the fuel cell stack, this not only allows more suitable load transfer in the stacking direction and can equalize pressure applied to the components, but also allows simplification of the overall fuel cell stack and reduction of the production cost.

The above-described solid oxide fuel cell stack 1 generates electric power when fuel gas (e.g. hydrogen, hydrocarbon fuel and the like, which may contain water according to need) is supplied to the anode side through the through hole 20d on the second main surface 20b and oxidant gas (e.g. oxygen, air or the like) is supplied to the cathode side through the through hole 20c on the first main surface 20a.

Next, a separator for a solid oxide fuel cell stack according to an embodiment of the present invention will be described in detail. The same reference signs are denoted to the same components as those of the above-described embodiment, and the repetitive description thereof is omitted.

As illustrated in FIG. 3 to FIG. 5 and FIG. 8 to FIG. 10, the separator 20 for a solid oxide fuel cell stack according to the embodiment includes at least one predetermined first ridge 21 disposed on a first main surface 20a; at least one predetermined second ridge 22 disposed on a second main surface 20b; at least one predetermined first groove 26 disposed on the second main surface 20b; and at least one predetermined second groove 25 disposed on the first main surface 20a. At least one first groove 26 on the second main surface 20b is defined by at least one first ridge 21 on the first main surface 20a. Further, at least one second groove 25 on the first main surface 20a is defined by at least one second ridge 22 on the second main surface 20b.

At least one first ridge 21 on the first main surface 20a and at least one second ridge 22 on the second main surface 20b of the separator 20 are arranged at regular intervals from the center C of the separator in a cross section perpendicular to a first or second gas channel G.

A predetermined gas channel G and a predetermined intermediate portion CL overlap with each other in the stacking direction of the separator 20. As used herein, the "predetermined gas channel G" refers to, for example, a gas channel G that is through the center C of the separator among at least one first gas channel G formed between at least one first ridge 21 and at least one second groove 25 on the first main surface 20a of the separator 20 and at least one second gas channel G formed between at least one second ridge 22 and at least one first groove 26 on the second main surface 20b of the separator 20. Further, the "predetermined intermediate portion CL" refers to, for example, an intermediate portion between the first ridge 21 or the second ridge 22 on the first main surface 20a or the second main surface 20b running closest to the center C of the separator and the second groove 25 or the first groove 26 on the first main surface 20a or the second main surface 20b running closest to the center C of the separator.

A fuel cell stack is assembled from the above-described separators for a fuel cell stack such that the separator is installed via the cell unit by rotating the separator by 180 degrees in a plane with respect to the center of the separator. In this way, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows suitable load transfer in the stacking direction and can further equalize pressure applied to the components. This can also further improve the flatness of the fuel cell stack. As a result, in the fuel cell stack, this can further equalize pressure applied to the components. In the fuel cell stack, this also allows more suitable load transfer in the stacking direction.

It is preferred that the separator 20 includes at least one first predetermined protrusion 23 disposed on the first main surface 20a, at least one predetermined second protrusion 24 disposed on the second main surface 20b, at least one predetermined first recess 28 disposed on the second main surface 20b, and at least one predetermined second recess 27 disposed on the first main surface 20a. At least one second recess 27 is defined by at least one second protrusion 24 on the second main surface 20b of the separator 20. Further, at least one first recess 28 is defined by at least one first protrusion 23 on the first main surface 20a of the separator 20.

It is preferred that at least one first protrusion 23 on the first main surface 20a and at least one second protrusion 24 on the second main surface 20b of the separator 20 are disposed such that the at least one first protrusion 23 is disposed point symmetrical to the at least one second protrusion 24 with respect to the center C of the separator in in-plane rotation and protrudes in a direction opposite to a direction of protruding the second protrusion 24.

A fuel cell stack is assembled from the above-described separators for a fuel cell stack such that the separator is installed via the cell unit by rotating the separator by 180 degrees in a plane with respect to the center of the separator. In this way, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows more suitable load transfer in the stacking direction and can further equalize pressure applied to the components. This can also further improve the flatness of the fuel cell stack. As a result, in the fuel cell stack, this can further equalize pressure to be applied to the components. In the fuel cell stack, this also allows more suitable load transfer in the stacking direction.

It is preferred that the separator 20 has a point symmetrical shape with respect to the center C of the separator in in-plane rotation. That is, the separator 20 includes a power generation area 20A at the center and diffusion areas 20B at outer sides of the power generation area 20A and has through holes 20c, 20d, 20e, 20f at an outer side of the diffusion area 20B penetrating the first main surface 20a and the second main surface 20b. Needless to say, through holes 20c, 20d, 20e, 20f are disposed point symmetrically with respect to the center C of the separator in in-plane rotation.

As used herein, the "separator center C" means, for example, the center of gravity of the outer shape of the separator in a view in the stacking direction.

A fuel cell stack is assembled from the above-described separators for a fuel cell stack such that the separator is installed via the cell unit by rotating the separator by 180 degrees in a plane with respect to the center of the separator. In this way, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows more suitable load transfer in the stacking direction and can further equalize pressure applied to the components. This can also improve the flatness of the fuel cell stack. As a result, in the fuel cell stack, this can further equalize the pressure applied to the components. In the fuel cell stack, this also allows more suitable load transfer in the stacking direction. Furthermore, the fuel cell stack is advantageous in simplification of the overall fuel cell stack and reduction of the production cost.

It is preferred that the separator 20 is constituted by a single plate.

A fuel cell stack is assembled from the above-described separators for a fuel cell stack such that the separator is installed via the cell unit by rotating the separator by 180 degrees in a plane with respect to the center of the separator. In this way, the first ridge and the second ridge of the separator are arranged such that a first ridge and a second ridge of a first separator of two separators holding each cell unit overlap respectively with a second ridge and a first ridge of a second separator of the two separators in a stacking direction of the separators across a single cell intervened between the two separators. In the fuel cell stack, this allows more suitable load transfer in the stacking direction and can further equalize pressure applied to the components. This can also further improve the flatness of the fuel cell stack. As a result, in the fuel cell stack, this can equalize pressure to be applied to the components. In the fuel cell stack, this also allows more suitable load transfer in the stacking direction. Furthermore, the separator for a fuel cell stack is also advantageous in simplification of the overall fuel cell stack and reduction of the production cost. For example, the separator can be formed from a metal plate such as a stainless-steel plate by press molding.

While the present invention is described with a few embodiments, the present invention is not limited to those embodiments, and various changes can be made within the features of the present invention.

For example, the above-described features of the preferred embodiments of the fuel cell stack and the separator for a fuel cell stack can be suitably combined.

REFERENCE SIGNS LIST

1 Solid oxide fuel cell stack
10 Cell unit
11 Single cell
111 Electrolyte
112 Anode
113 Cathode
12 Metal support member
121 Center portion
122 Peripheral portion
13 Insulator
14 Gas diffusing current collector
20 Separator
20A Power generation area
20B Diffusion area
20C Outer edge portion
20a First main surface
20b Second main surface 20c, 20d, 20e, 20f Through hole
21, 22 First ridge, second ridge
23, 24 First protrusion, second protrusion
25, 26 Second groove, first groove
27, 28 Second recess, first recess
30 Sealing member
40 Joining portion
C Separator center
CL Intermediate portion

The invention claimed is:

1. A fuel cell stack, comprising: cell units and separators that are alternately stacked, in which each of the cell units comprises a single cell, a metal support member and an insulator, wherein each of the separators comprises:
- at least one first ridge that is disposed on a first main surface of each of the separators to form at least one first gas channel between said each of the separators and a first cell unit, the at least one first ridge including at least two ridges disposed at a predetermined interval on the first main surface of each of the separators; and
- at least one second ridge that is disposed on a second main surface of each of the separators to form at least one second gas channel between said each of the separators and a second cell unit, the at least one second ridge including at least two ridges disposed at a predetermined interval on the second main surface of each of the separators,
- the at least one first ridge and the at least one second ridge are disposed at a regular interval from a center of each of the separators in a cross section perpendicular to the at least one first gas channel or the at least one second gas channel,
- the at least one first ridge and the at least one second ridge of the separators are arranged such that the at least one first ridge and the at least one second ridge of a first separator of two of the separators holding each of the cell units at least partly overlap respectively with the at least one second ridge and the at least one first ridge of a second separator of the two of the separators in a stacking direction of the separators across a single cell intervened between the two of the separators,
- each of the separators comprises a plurality of first protrusions protruding from the first main surface of each separator in a first direction to form at least one third gas channel between said each of the separators and the first cell unit, the at least one third gas channel being connected to the at least one first gas channel, and a plurality of second protrusions protruding from the second main surface of each separator in a direction opposite to the first direction to form at least one fourth gas channel between said each of the separators and the second cell unit, the at least one fourth gas channel being connected to the at least one second gas channel,
- the plurality of first protrusions and the plurality of second protrusions of each of the separators are arranged such that the plurality of first protrusions and the plurality of second protrusions of the two of the separators that hold each of the cell units at least partly overlap with each of the cell units except for the single cell in the stacking direction of the separators,
- at least one of the plurality of first protrusions disposed in a first area of each separator is point symmetrical to at least one of the plurality of second protrusions disposed in a second area of each separator with respect to the center of each of the separators in in-plane rotation, the second area of each separator being different from the first area and being point symmetrical to the first area with respect to the center of each of the separators, and
- at least one of the plurality of first protrusions disposed in the second area of each separator is point symmetrical to at least one of the plurality of second protrusions disposed in the first area of each separator with respect to the center of each of the separators in in-plane rotation.

2. The fuel cell stack according to claim 1, wherein the at least one first ridge and the at least one second ridge of the separators are arranged such that the at least one first ridge and the at least one second ridge of the two of the separators that hold each of the cell units at least partly overlap with the single cell of each of the cell units in the stacking direction of the separators.

3. The fuel cell stack according to claim 1, wherein the at least one first ridge and the at least one second ridge are disposed alternately from the center of each of the separators in a cross section perpendicular to the first or second gas channel.

4. The fuel cell stack according to claim 1, wherein each of the separators further comprises:
- at least one first groove that is defined by the at least one first ridge and that is disposed to form the at least one second gas channel; and
- at least one second groove that is defined by the at least one second ridge and that is disposed to form the at least one first gas channel.

5. The fuel cell stack according to claim 4, wherein a first gas channel that runs through the center of each of the separators among the at least one first gas channel formed by the at least one first ridge and the at least one second groove at least partly overlaps with an intermediate portion that is between a first ridge running closest to the center of each of the separators and a first groove running closest to the center of each of the separators in the stacking direction of the separators, or
a second gas channel that runs through the center of each of the separators among the at least one second gas channel formed by the at least one second ridge and the at least one first groove at least partly overlaps with an intermediate portion that is between a second ridge running closest to the center of each of the separators and a second groove running closest to the center of each of the separators in the stacking direction of the separators.

6. The fuel cell stack according to claim 1,
wherein the at least one first protrusion and the at least one second protrusion of the separator are arranged such that the at least one first protrusion and the at least one second protrusion of the two of the separators that hold each of the cell units overlap with each other in the stacking direction of the separators.

7. The fuel cell stack according to claim 1, wherein each of the separators comprises:
- at least one first recess that is defined by the at least one first protrusion and that is disposed to form the at least one fourth gas channel; and
- at least one second recess that is defined by the at least one second protrusion and that is disposed to form the at least one third gas channel.

8. The fuel cell stack according to claim 1, wherein each of the separators has a point symmetrical shape with respect to the center of each of the separators in in-plane rotation.

9. The fuel cell stack according to claim 1, wherein each of the separators is constituted by a single plate.

10. The fuel cell stack according to claim 1,
wherein in the single cell, an electrolyte is intervened between an anode and a cathode,
the metal support member comprises a center portion including porous metal and at least one peripheral portion including metal around the center portion,
the anode is intervened between the electrolyte and the center portion, and
the insulator is disposed at a side of the cathode of the at least one peripheral portion.

11. The fuel cell stack according to claim 10, wherein at least a part of an outer edge portion of each of the separators is joined to a side of the anode of the at least one peripheral portion.

* * * * *